United States Patent
Murray et al.

[11] 3,935,786
[45] Feb. 3, 1976

[54] SELF-DRILLING RIVET

[75] Inventors: Pierre Charles Murray, DeKalb; Richard Maclay Chattin, Schaumburg, both of Ill.

[73] Assignee: Illinois Tool Works Inc., Chicago, Ill.

[22] Filed: Nov. 1, 1974

[21] Appl. No.: 519,958

[52] U.S. Cl. ......................................... 85/68; 85/70
[51] Int. Cl.² .......................................... F16B 13/04
[58] Field of Search ............... 85/78, 77, 68, 70, 71

[56] References Cited
UNITED STATES PATENTS

| | | | |
|---|---|---|---|
| 1,271,408 | 7/1918 | Wood | 85/77 |
| 1,449,625 | 3/1923 | Phillips | 85/68 |
| 2,409,352 | 10/1946 | Gill | 85/70 |
| 3,072,009 | 1/1963 | Stau et al. | 85/77 |
| 3,750,518 | 8/1973 | Rayburn | 85/68 |
| 3,772,957 | 11/1973 | Newton | 85/68 |
| 3,851,559 | 12/1974 | Baude | 85/71 |

FOREIGN PATENTS OR APPLICATIONS

| | | | |
|---|---|---|---|
| 705,797 | 5/1966 | Italy | 85/61 |
| 16,209 | 5/1971 | Japan | 85/77 |
| 61,144 | 7/1939 | Norway | 85/77 |

*Primary Examiner*—Marion Parsons, Jr.
*Attorney, Agent, or Firm*—T. W. Buchman; Robert W. Beart

[57] ABSTRACT

A self-drilling and blind setting rivet assembly for power tool application to workpiece means including a hollow rivet sleeve with an enlarged head at one end. A mandrel with a drill point at one end positioned through the bore of the sleeve so that the drill point on the mandrel is positioned adjacent the end of the sleeve opposite the head portion. The mandrel shank will have a weakened portion of reduced cross-sectional area with the inner periphery of the sleeve and outer periphery of the shank including cooperating torque transmitting surfaces on either side of the weakened portion of the shank to allow torque to be applied directly to the shank with the torque transmitting means serving to bridge the weakened portion of the shank to enable the drill point to drill a hole and yet allow the shank to fracture upon appropriate tensile force during the setting operation.

10 Claims, 13 Drawing Figures

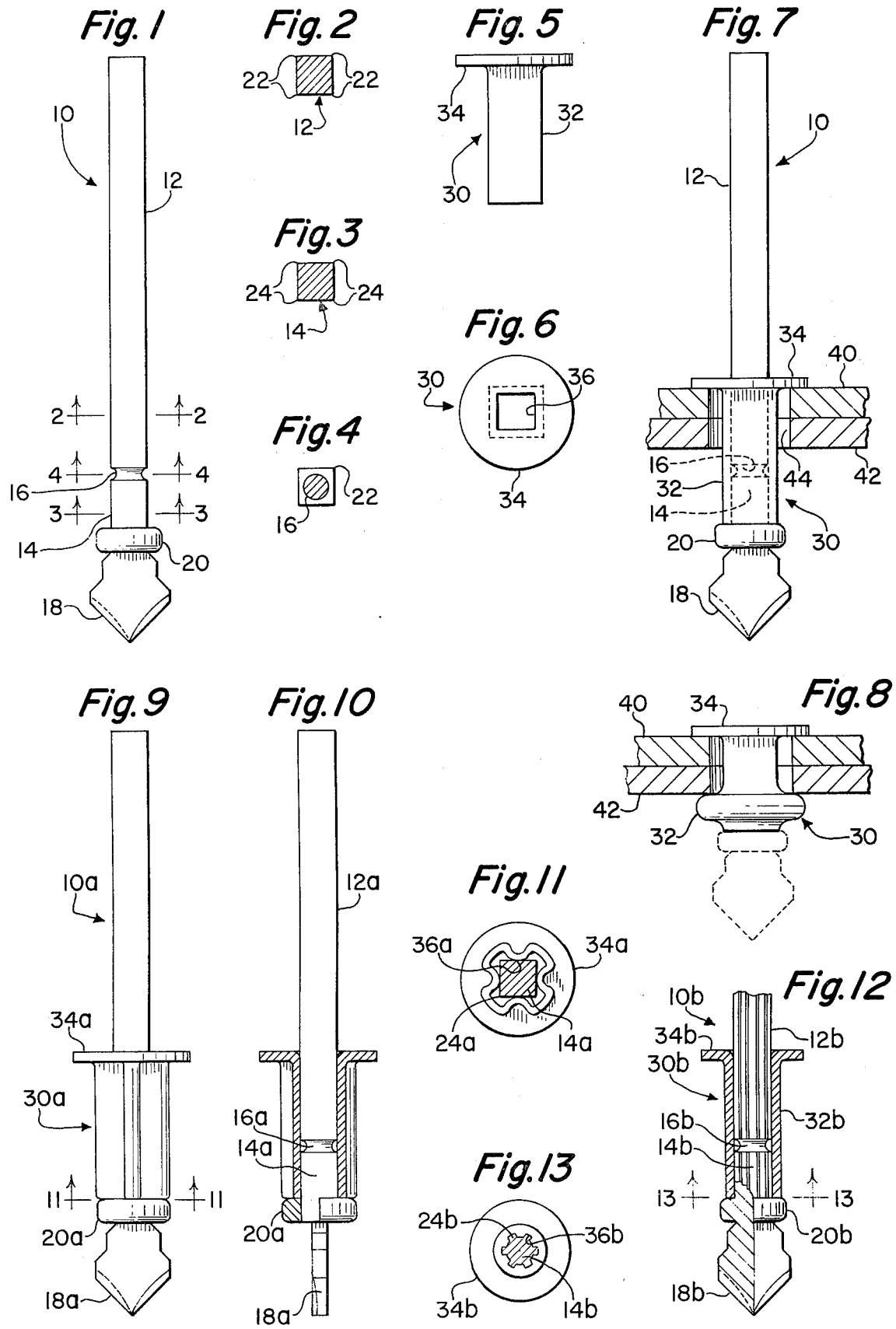

SELF-DRILLING RIVET

BACKGROUND OF THE INVENTION

There have been developed so called blind setting rivets for securing sheet metal work parts or the like without requiring access to both sides of the parts. It is common practice to utilize a blind setting rivet assembly which includes a sleeve with an enlarged head and bore therethrough and a mandrel extending through the bore with an enlarged portion for upsetting the sleeve. This prior art device requires that holes be provided through the work so that the assembly may be inserted therethrough, followed by a retractive force applied to the mandrel causing the inner region of the sleeve to radially expand. The mandrel typically includes a weakened portion of generally annular reduced cross-sectional area so that the upper portions of the shank will fracture and disassociate from the lower portions. Self-drilling blind setting rivets of this type are not generally available since the mandrel must be positively rotated by the power tool for the drilling operation and must transmit torque through the weakened portion to a drilling tip. With some materials to be fabricated, the weakened portion of the shank does not permit sufficient torque to be transmitted to the drilling tip without premature shearing at the weakened portion which has been variously provided as by notching, peripheral grooving, etc.

SUMMARY OF THE INVENTION

In view of the foregoing, it is the principal object of this invention to provide a self-drilling and blind setting rivet which is capable of accepting and transmitting appropriate driving torque to the drilling tip without premature fracture in the weakened area of the mandrel.

It is, accordingly, another object of the invention to provide a self-drilling and setting rivet assembly which includes a shank particularly configured to be weakened in tensile strength and yet not appreciably weakened in torque transmitting capabilities.

Yet another object of the invention is to provide a blind setting rivet assembly which is provided with a drilling tip by forging techniques.

The above and other objects and advantages of the invention are provided by a rivet assembly which will include a hollow rivet sleeve body with a radially enlarged head at one extremity and wherein the inner periphery of a bore extending through the sleeve includes particularly designed torque transmitting surfaces so that the cross-sectional configuration of the sleeve is generally noncircular providing grooves, corners, flat surfaces or the like. The drilling and setting mandrel used with this assembly will include a drill tip, and an enlarged shoulder immediately above and adjacent the drill tip of such a transverse dimension to uniformly enlarge the sleeve body upon application of axial setting forces. The shank portion above the drill point and shoulder will have an outer peripheral surface of generally noncircular configuration which includes torque transmitting surfaces complementary to the torque transmitting surfaces in the bore of the sleeve. A weakened, reduced cross-sectional area of the shank is provided so that portions of the shank including torque transmitting surface means are located on either side thereof. With such an arrangement of cooperating torque transmitting surfaces, the torque applied to the shank bridges the weakened section to enable the appropriate drilling torque to be applied to the workpiece and yet allow the shank to be fractured upon a predetermined tensile force.

Other objects and features of the invention will in part be obvious and hereinafter more fully pointed out in the accompanying drawings and description of the invention.

BRIEF DESCRIPTION OF THE DRAWINGS

FIG. 1 is a side elevation view of a mandrel which is a member of the rivet assembly.

FIG. 2 is a transverse section taken along the line 2—2 of FIG. 1.

FIG. 3 is a transverse section taken along the line 3—3 of FIG. 1.

FIG. 4 is a transverse section taken along the line 4—4 through the weakened section of the shank shown in FIG. 1.

FIG. 5 is a side elevation view of the rivet sleeve which is a member of the rivet assembly.

FIG. 6 is a top plan view of the sleeve of FIG. 5.

FIG. 7 is a side elevation showing the rivet assembly after it has drilled a hole in workpiece material.

FIG. 8 is a view similar to FIG. 7 after the rivet assembly has been set by retraction of the mandrel and separating the upper portion of the mandrel from the lower portion.

FIG. 9 is a front elevation view of another embodiment of the rivet assembly.

FIG. 10 is a side elevation view of the assembly in FIG. 9 in partial section.

FIG. 11 is a transverse section taken along the line 11—11 of FIG. 9.

FIG. 12 is a longitudinal sectional view of yet another embodiment of a rivet assembly utilizing interlocking grooves and ribs.

FIG. 13 is a transverse sectional view taken along the lines 13—13 of FIG. 12.

DETAILED DESCRIPTION OF THE INVENTION

In FIG. 1, a self-drilling mandrel member 10 has an elongated shank with an upper portion 12 and a lower portion 14 and a weakened area of reduced cross-sectional configuration 16 intermediate these two portions of the shank. A drilling point 18 is formed on the extremity nearest the weakened section 16 and a shoulder portion 20 is formed directly adjacent to the drilling point. The upper portion of the shank may be provided with various configurations facilitating use with various types of power tools for providing rotary motion and/or pulling tension to the shank.

A generally tubular rivet body 30, one embodiment of which is shown in FIGS. 5 and 6, telescopically receives the shank of the mandrel within a bore 36. The body 30 is generally comprised of a sleeve section 32 and an enlarged head portion 34 of any desired configuration which is adapted to abut a workpiece in a manner to be described later herein. The bore 36 will be of such a configuration to conform generally and cooperate with the outer periphery of the shank of the mandrel.

Turning to the embodiment shown most clearly with reference to FIGS. 2, 3, 4 and 6, it will be seen that the outer periphery of the upper mandrel section 12 and lower mandrel section 14 is polygonal with a plurality of corners 22 and 24 formed respectively thereon. The bore 36 of the rivet body 30 is likewise of a similar polygonal configuration allowing the corners 22 and 24 of the mandrel to mate and cooperate with the corners of the bore. Such a configuration resists relative rotative movement between the mandrel and the rivet sleeve and serve as structure to transmit the torque to the drilling tip 18 from the upper regions of the shank portion 12. The sleeve 30 thus acts to bridge the weakened section 16 and somewhat isolates the weakened section from the relatively high torque developed during the drilling operation.

In FIG. 7, the rivet assembly has, in association with power tool means, not shown, drilled holes in superimposed work sheets 40 and 42. At this time, the head 34 of the rivet body abuts on the upper surface of the uppermost workpiece and is retained there by a suitable tool (not shown), and using somewhat conventional techniques, the upper region 12 of the mandrel is grasped by a tool means and is axially retracted. The weakened section 16, of reduced cross-sectional area, is designed to fracture at a predetermined tensile load, which will be greater than the tensile load required for the shoulder 20 to cause the lower regions of the sleeve 32 to radially deform and enlarge beneath the lowermost workpiece 42. A typical deformed and final configuration is shown in FIG. 8. It should be understood that the remnant end of the mandrel with the shoulder and drill point may be retained within the rivet body or may drop out.

It should also be understood that mating torque transmitting surfaces formed in the bore of a rivet sleeve and on upper and lower portions of a mandrel shank can take a variety of forms and should not be limited to the forms above described relative to the preferred embodiment. Two of such acceptable alternate embodiments will be described hereinafter wherein like reference numerals throughout the various views are intended to designate similar elements or components.

With reference to FIGS. 9 and 10, it will be seen that rivet mandrel 10a will include a shank of a generally polygonal cross-sectional configuration and includes an upper portion 12a and a lower portion 14a with a second of reduced cross-sectional area 16a formed between these shank portions. The rivet body 30a includes a radially enlarged head portion 34a and a sleeve portion 32a. It will be noted that the body portion is of a generally cylindrical configuration with a plurality of ribs 36a formed therein protruding into the bore of the body. As shown in FIG. 11, these ribs 36a cooperate with the corners 22a and 24a of the shank portions forming means to transmit torque to and from the body 30a in a manner which isolates and bridges the weakened section 16a. The ribbed configuration of the body may also enhance the shear strength of the rivet after it has been set.

Attention is also directed to the particular configuration of the drill point, 18, 18a and 18b shown in the various embodiments of the invention. It may be desirable to form the drill point utilizing forging techniques and produce a generally spade-type drill point or a drill point which has a width appreciably greater than thickness. This structure enables a hole to be drilled which is at least greater than the maximum transverse dimension of the sleeve.

However, such a configured drill point could not in and of itself satisfactorily function as a means to radially enlarge the lower region of the rivet body since it would create highly localized forces tending to cut the sides of the lower region of the body rather than uniformly expand the body beneath the workpieces. It is, therefore, advisable to form a generally annular collar or shoulder 20a immediately adjacent and above the drill point to produce a balanced expanding force on the rivet body. It should be understood that this shoulder may be formed integral with the shank as 20b in FIG. 12 or may be a discrete collar member 20a slipped over the shank portion and resting on the drill point as is shown in FIG. 10.

Yet another embodiment of the invention including torque transmitting and bridging means is shown in FIGS. 12 and 13. In this version of the invention, interlocking splines and grooves are formed in the mating surfaces of the rivet mandrel 10b and bore of the rivet body 30b. Thus, upper regions 12b of the shank and lower regions 14b of the shank will include, respectively, splines 22b and 24b which mate and cooperate with grooves 36b formed in the rivet sleeve. The grooves could be preformed in the sleeve or formed during the insertion of the shank within the sleeve. The sleeve could be of a material somewhat softer than the shank and sharp projections formed on both the upper and lower regions of the shank could cut mating torque transmitting grooves in the bore of the sleeve as the mandrel is forced axially into the sleeve.

With reference to the mandrel configuration shown in FIGS. 1–11, a further aspect of the invention will be shown and described. It has been found that a shank having a generally polygonal cross-sectional configuration which has been weakened by providing a groove extending about the periphery of one portion of the shank forming a generally annular cross-sectional configuration at that portion will produce a shank wherein the torsional strength of the weakened section will be generally 5–10% less than that of the remainder of the shank but will be at least 25% weaker in tensile strength than the remaining portions of the shank. Thus, providing a generally polygonally configured shank to a self-drilling pull-to-set rivet and forming a weakened section having a generally annular cross section, will decrease the tensile strength to a greater percentage than it will decrease the torsional strength. This is obviously advantageous in the environment described wherein the shank must be capable of fracturing at a tensile load but still be capable of transmitting sufficient drilling torque to appropriately drill a hole in metal.

Thus, it is apparent that there has been provided, in accordance with the invention, a blind rivet assembly capable of accepting and transmitting torque from the upper regions of the shank of a mandrel to an integral drill point and yet be weakened in such a manner as to fracture at a predetermined axial retraction force to enable upper regions of the mandrel to be discarded after the rivet has been set. While the invention has been described in conjunction with specific embodiments thereof, it is apparent that many alternatives, modifications and variations will be apparent to those skilled in the art in light of the foregoing description. Accordingly, it is intended to embrace all such alternatives, modifications and variations as fall within the spirit and broad scope of the appended claims.

We claim:

1. A self-driling and setting rivet assembly including a sleeve member surrounding a mandrel member, the sleeve including an enlarged head portion at one end thereof adapted to abut the upper surface of a workpiece, the mandrel member having a shank portion with a drill point at one extremity thereof and shoulder means adjacent the drill point, the shoulder means having a transverse dimension greater than the inner diameter of the sleeve member to radially enlarge the sleeve as the mandrel is retracted upwardly relative to the sleeve, the drill point including a transverse dimension at least as great as the outer diameter of the sleeve to allow the sleeve to enter the aperture formed in a workpiece by the drill point, the shank having a weakened section of reduced cross-sectional area spaced upwardly from the shoulder means to allow the lower portion of the shank to be disassociated from the upper portion upon application of a predetermined tensile force to the shank, the sleeve positioned on the mandrel so as to surround the weakened shank section as well as portions of the shank above and below the weakened section, the shank also including torque transmitting surface means located both above and below the weakened section, the inner peripherey of the sleeve including torque transmitting surface means adapted to cooperate with the torque transmitting surface means on the shank, the cooperating torque transmitting surface means and the sleeve portion intermediate the torque transmitting means above and below the weakened section of the shank forming means to bridge the weakened section and thereby increasing the torque accepting radius of the assembly in the region of the weakened section thereby enabling torque to be transmitted from the upper section of the shank to the drill point without subjecting the weakened section to appreciable torque forces.

2. A rivet assembly in accordance with claim 1, wherein the cooperating torque transmitting surface means includes longitudinally extending ribs located above and below the weakened section of the shank and mating grooves formed on the inner periphery of the sleeve.

3. A rivet asembly in accordance with claim 1, wherein the shank is generally polygonal in cross section and the cross-sectional configuration of the sleeve is noncircular, forming surfaces adapted to abut and transmit torque from and to the polygonal shank.

4. A rivet assembly in accordance with claim 3, wherein the shank is generally square in cross-sectional configuration.

5. A rivet assembly in accordance with claim 1, wherein the shank is generally polygonal in cross-section at least along the longitudinal extent surrounded by the sleeve, the weakened section being a groove formed in the periphery of the shank providing a reduced cross-sectional area of generally circular configuration intermediate the extremities of the polygonal portion.

6. A rivet assembly in accordance with claim 1, wherein the inner peripherey of the sleeve member and the outer periphery of the shank portion include cooperating noncircular cross-sectional segments which form the torque transmitting surface means.

7. A rivet assembly in accordance with claim 1, wherein the shank is generally square in cross-section, the weakened portion of the shank is generally circular in cross section and the sleeve is generally square in cross section.

8. A rivet assembly in accordance with claim 1, wherein the drill point is substantially flat with a thickness substantially less than its width and the shoulder is generally annular to apply uniform expanding forces to the lower extremity of the sleeve.

9. The rivet assembly of claim 8, wherein the annular shoulder is formed integral with the shank.

10. The rivet assembly of claim 8, wherein the annular shoulder comprises a separable ring member adapted to be positioned around the shank in the vicinity of the drill point.

* * * * *